United States Patent
Svantesson

(10) Patent No.: US 6,983,996 B2
(45) Date of Patent: Jan. 10, 2006

(54) SAFETY HEADREST FOR A MOTOR VEHICLE

(75) Inventor: Anders Svantesson, Tollered (SE)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 10/471,064

(22) PCT Filed: Mar. 11, 2002

(86) PCT No.: PCT/SE02/00434

§ 371 (c)(1),
(2), (4) Date: Mar. 23, 2004

(87) PCT Pub. No.: WO02/074579

PCT Pub. Date: Sep. 26, 2002

(65) Prior Publication Data

US 2004/0245833 A1    Dec. 9, 2004

(30) Foreign Application Priority Data

Mar. 15, 2001  (GB) .................................... 0106470

(51) Int. Cl.
*B60N 2/42* (2006.01)

(52) U.S. Cl. .................... 297/408; 297/391; 297/396; 297/216.12; 297/216.14

(58) Field of Classification Search .......... 297/216.12, 297/391, 396, 404, 408, 409, 216.14
See application file for complete search history.

(56) References Cited

U.S. PATENT DOCUMENTS

| 3,802,737 A | * | 4/1974 | Mertens ................... 297/216.2 |
| 5,378,043 A | | 1/1995 | Viano et al. |
| 5,795,019 A | | 8/1998 | Wieclawski |
| 5,829,838 A | * | 11/1998 | Offenbacher ................ 297/408 |
| 5,884,968 A | * | 3/1999 | Massara ................ 297/216.12 |
| 5,927,804 A | * | 7/1999 | Cuevas .................. 297/216.12 |
| 5,938,279 A | | 8/1999 | Schubring et al. |
| 6,019,424 A | * | 2/2000 | Ruckert et al. ........ 297/216.12 |
| 6,033,017 A | | 3/2000 | Elqadah et al. |
| 6,033,018 A | | 3/2000 | Fohl |
| 6,199,947 B1 | | 3/2001 | Wiklund |
| 6,568,753 B1 | * | 5/2003 | Watanabe ............. 297/216.12 |
| 6,604,788 B1 | * | 8/2003 | Humer ................... 297/216.13 |

FOREIGN PATENT DOCUMENTS

| DE | 199 61 618 C1 | 4/2001 |
| GB | 2 316 862 A | 3/1998 |
| GB | 2 316 863 A | 3/1998 |
| GB | 2 318 729 A | 5/1998 |
| WO | WO-98/09838 | 3/1998 |

* cited by examiner

*Primary Examiner*—Laurie K. Cranmer
(74) *Attorney, Agent, or Firm*—Madson & Metcalf

(57) ABSTRACT

A vehicle seat (1) as a head-rest (5) which is mounted for movement about a horizontal axis defined by a bar (7) depending arms (12) extend downwardly into the back of the seat and carry a pressure plate (13) at a position behind the torso of the occupant of the seat so that pressure applied to the pressure plate (13) will cause the head-rest (5) to move forwardly. The pressure plate (13) is pivotally connected (14, 15, 16, 17) to the arms (12) to enable the arrangement to pivot to the maximum extent in a situation where the rear part of the seat is rigid, for example if the seat is a rear seat in a motor vehicle.

17 Claims, 3 Drawing Sheets

SAFETY HEADREST FOR A MOTOR VEHICLE

BACKGROUND OF THE INVENTION

1. Field of the Invention

THE PRESENT INVENTION relates to a safety arrangement, and more particularly relates to a safety arrangement incorporated in a vehicle seat.

2. Description of Related Art

It is known to use, in a vehicle, a seat which is provided with a head-rest mounted on the back of the seat, the head-rests being adapted to move forwardly in the event that a rear impact should occur to provide protection for the occupant of the seat in order to minimise, or obviate whiplash injuries. Such a head-rest may be termed an "active" head-rest.

It has been proposed previously to provide an active head-rest which is activated when the occupant of the seat is pressed into the back-rest of the seat, as a consequence of a rear impact situation. Such a prior proposed arrangement incorporates a head-rest which is mounted for pivotal movement about a horizontal axis adjacent the top of the seat, the head-rest being connected, by appropriate arms, to a pressure plate which is mounted within the back-rest of the seat. As the torso of the occupant of the seat is pressed into the back-rest of the seat during a rear impact, the pressure plate is moved in a rearward direction, thus causing the head-rest itself to move forwardly, so that the head-rest is brought into a position immediately behind the head of the occupant. An arrangement of this type is shown in U.S. Pat. No. 5,378,043.

This prior proposed arrangement is intended for use in the front seat of a motor vehicle. Typically the front seat of a motor vehicle has a back-rest formed from an inverted "U"-shaped frame, with appropriate springing and padding filling the area between the parallel arms of the frame. Typically both the forward facing side and the rearward facing side of the back-rest are made to be soft and flexible so that the seat is not only comfortable for a person sitting in the seat, but also is not uncomfortable for the knees of a person sitting in the seat behind. Thus, in the prior art arrangement, the pressure plate can move rearwardly relative to the inverted "U"-shaped frame when a rear impact occurs.

In many vehicles, the rear part of the back-rest of a rear seat is constituted by a rigid panel. One reason for this is that typically the rear part of the back-rest of the rear seat forms an upright wall defining part of the boot or trunk. This wall must be sufficiently strong to prevent any luggage present in the boot or trunk from entering the passenger compartment in a frontal impact situation. Also, in many cases the back-rest of the rear seat may fold downwardly, and then the panel at the back of the back-rest forms part of a load-bearing platform.

If a head-rest of the type described in U.S. Pat. No. 5,378,043 were to be mounted in the back-rest of a rear seat, having a rigid rear panel, the pressure plate would, in a rear impact situation, almost immediately engage the rigid rear panel, and thus the head-rest would not be moved sufficiently forwardly to prevent whiplash injuries.

Whilst it might be possible to make the back-rest "thicker", thus creating more space for movement of the pressure plate, car manufacturers tend to prefer seats that are as thin and as light as possible. Whilst one might contemplate providing a hatch in the rigid plate, adapted to open in the event of a rear impact, to allow the pressure plate to move rearwardly, it is very difficult to provide a hatch whilst still maintaining a rear panel for the seat, which is flat. A flat surface for the rear panel is important when the back-rest of the rear seat is folded forwardly so that the panel forms a load-bearing platform. Also, of course, if the boot or trunk of the vehicle is full of luggage, luggage would be adjacent the hatch and would prevent the hatch from opening. It is to be understood that if the pressure plate is located closer to the front surface of the back-rest of the seat, the pressure plate would prove to be uncomfortable.

SUMMARY OF THE INVENTION

The present invention seeks to provide an improved safety arrangement.

According to this invention there is provided a safety arrangement for a motor vehicle, the safety arrangement comprising a head-rest, means to mount the head-rest for pivotal movement about a predetermined horizontal axis adjacent the upper part of the back-rest of the seat, and depending means adapted to extend downwardly within the back-rest of the seat beneath the predetermined axis, and which carry a pressure plate to be located within the back-rest at a position behind the torso of an occupant of the seat, so that pressure applied to the pressure plate will cause the head-rest to move, the pressure plate being pivotally connected to the depending means.

Preferably the depending means comprise parallel arms.

Conveniently the pressure plate is provided with an integral locating element extending upwardly above the axis about which the pressure plate is pivotally connected to the depending means, the locating element being releasably connected to the depending means.

Advantageously the locating element is connected to the depending means by means of at least one spring clip.

Alternatively the locating element is connected to the depending means by means of at least one frangible element.

Conveniently a locating element is arranged in association with the pressure plate and the depending means in a position above the axis about which the pressure plate is pivotally connected to the depending means.

Preferably the locating element is deformable.

Preferably the means to mount the head-rest comprise a substantially horizontal bar adapted to be mounted, by means of bearings, on a frame within the back-rest of the seat, the axis of the horizontal rod being the said predetermined axis, the head-rest being connected to the bar.

Conveniently the depending means are connected to and depend from the bar.

In one embodiment of the invention the rear of the back-rest is provided with a rigid panel.

BRIEF DESCRIPTION OF THE DRAWINGS

In order that the invention may be more readily understood, and so that further features thereof may be appreciated, the invention will now be described, by way of example, with reference to the accompanying drawings in which.

DETAILED DESCRIPTION OF THE INVENTION

In the described embodiment of the invention a head-rest is provided on a vehicle seat, and the head-rest is adapted to move forwardly when there is a rear impact to reduce or obviate whiplash injuries.

Figure 1:
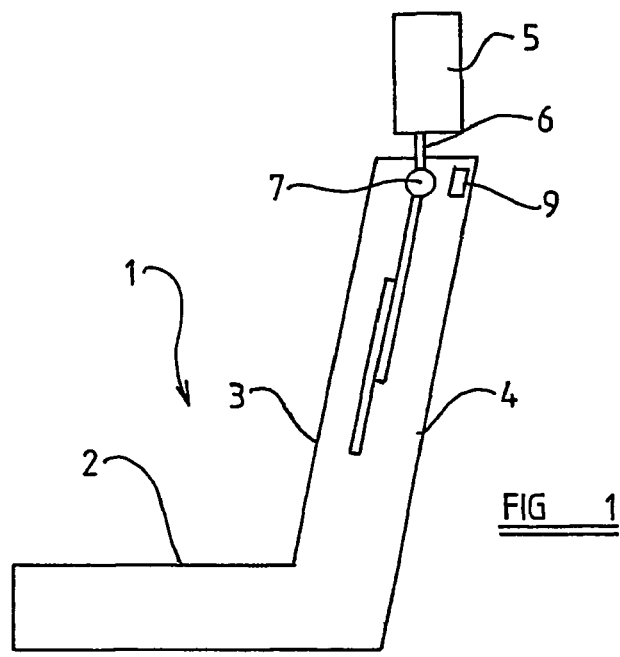
FIG. 1 is a schematic side elevational view of a vehicle seat incorporating a safety arrangement in accordance with one embodiment of the invention.

Referring to FIG. 1, a vehicle seat 1, intended for use in a rear seat, comprises a squab 2 and back-rest 3. The rear face of the back-rest 3 is in the form of a rigid panel 4. The back-rest 3 is associated with a head-rest 5. The head-rest 5 is initially mounted in position above the back-rest of the seat and is supported by a pair of parallel support arms 6. The parallel support arms 6 are connected to a pivotally mounted horizontal bar 7. The pivotally mounted bar 7 has opposed ends thereof supported in bearings 8 which are mounted on a horizontal frame member 9 located in the back-rest of the seat, the horizontal frame member 9, together with two vertical parallel arm members 10, 11, forming a substantially rigid inverted "U"-shaped frame contained within the seat.

Two further parallel arms 12 are also connected to the horizontal bar 7, the arms 12 depending within the back-rest of the seat. The lower ends of the arms 12 carry a pressure plate 13. The pressure plate 13 is provided with upwardly extending lugs 14, 15, which each receive an outwardly directed pivot pin 16, 17, carried at the lower ends of the arms 12. The pressure plate can thus pivot about the axis of the co-aligned pins 16, 17. In the described embodiment the pressure plate can only pivot in one pivotal direction from the initial position shown in FIG. 1. Pivotal movement in the opposite direction is prevented, for example by a stop, a ratchet or equivalent device. The pressure plate 13 incorporates an upwardly directed locating arm 18, which extends upwardly between the parallel arms 12. The upper end of the locating arm 18 is releasably connected to the arms 12 by releasable catches 19, 20, which may be spring catches, or which may be catches constituted by frangible elements adapted to break when subjected to a predetermined force. One or more springs, or other resilient means (not shown), may be provided to bias the head-rest to the "initial" position shown in FIG. 1.

It is to be appreciated that when the seat is in ordinary use, the head-rest will be substantially stationary. However, when a vehicle in which the seat is mounted is subjected to a rear impact, the torso of an occupant of the seat will move so that the torso is effectively forced into the back-rest 3 of the seat. The torso of the occupant will then engage the pressure plate 13, and the combination of the pressure plate 13, the parallel arms 12, the horizontal bar 7, the arm 6 and the head-rest 5, will pivot about the axis of the bar 7, the ends of the rod 7 rotating within the bearings 8. The head-rest 5 will thus begin to move forwardly.

Figure 3:
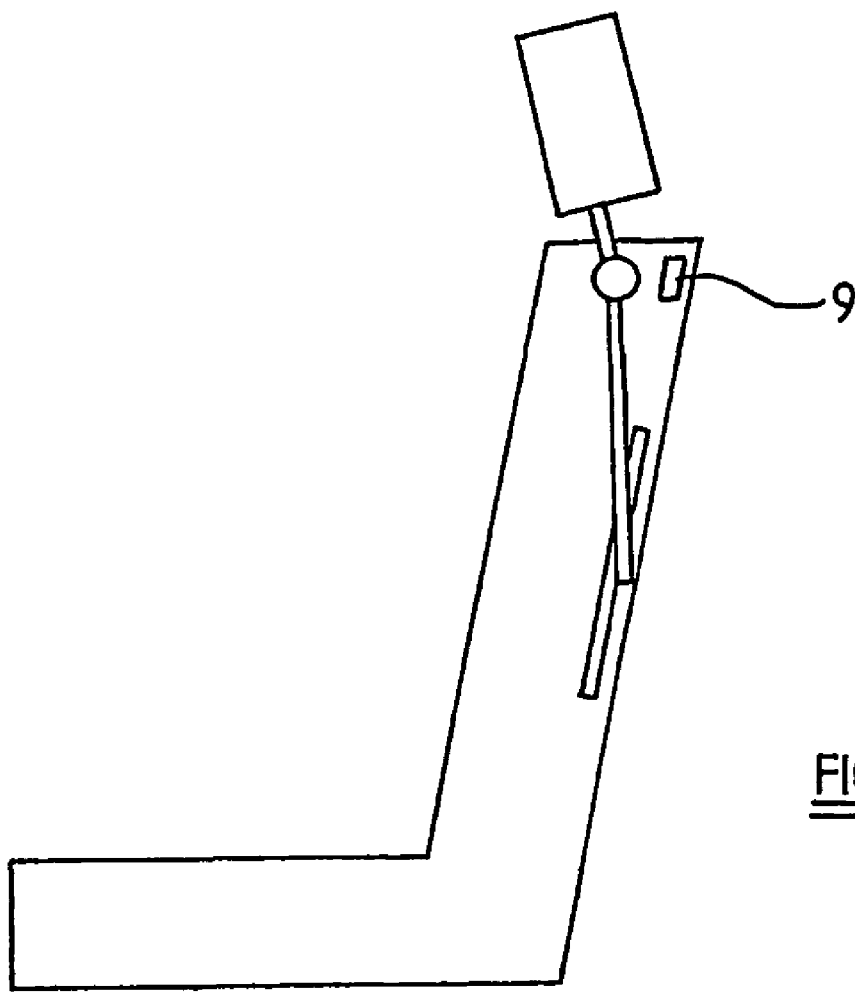
FIG. 3 is a view corresponding to FIG. 1 showing the seat in an alternate condition.

The lower-most edge of the pressure plate 13 will strike the rigid panel 4 provided at the rear of the back-rest 3. Continuing pressure applied to the pressure plate 13 by the torso of the occupant of the seat will cause the clips 19, 20 to be released so that the upper part of the locating arm 18 is no longer connected to the depending arms 12. The pressure plate is then free to rotate about the axis of the co-aligned pins 16, 17, in its single direction of pivotal movement. As can be seen from FIG. 3, this means that the pressure plate 13 will effectively pivot about the axis of the pins 16, 17, and also its own lower-most edge, which is engaging the rigid panel 4, will slide down the panel 4, whilst the upper part of the pressure plate 13 continues to move rearwardly, thus moving the lower-most ends of the depending arms 12 to a rearward position in which they substantially abut the rear panel 4. This enables the head-rest 5 to move forward sufficiently to engage the head of the occupant of the seat, to minimise or obviate the risk of a whiplash injury occurring.

Figure 2:
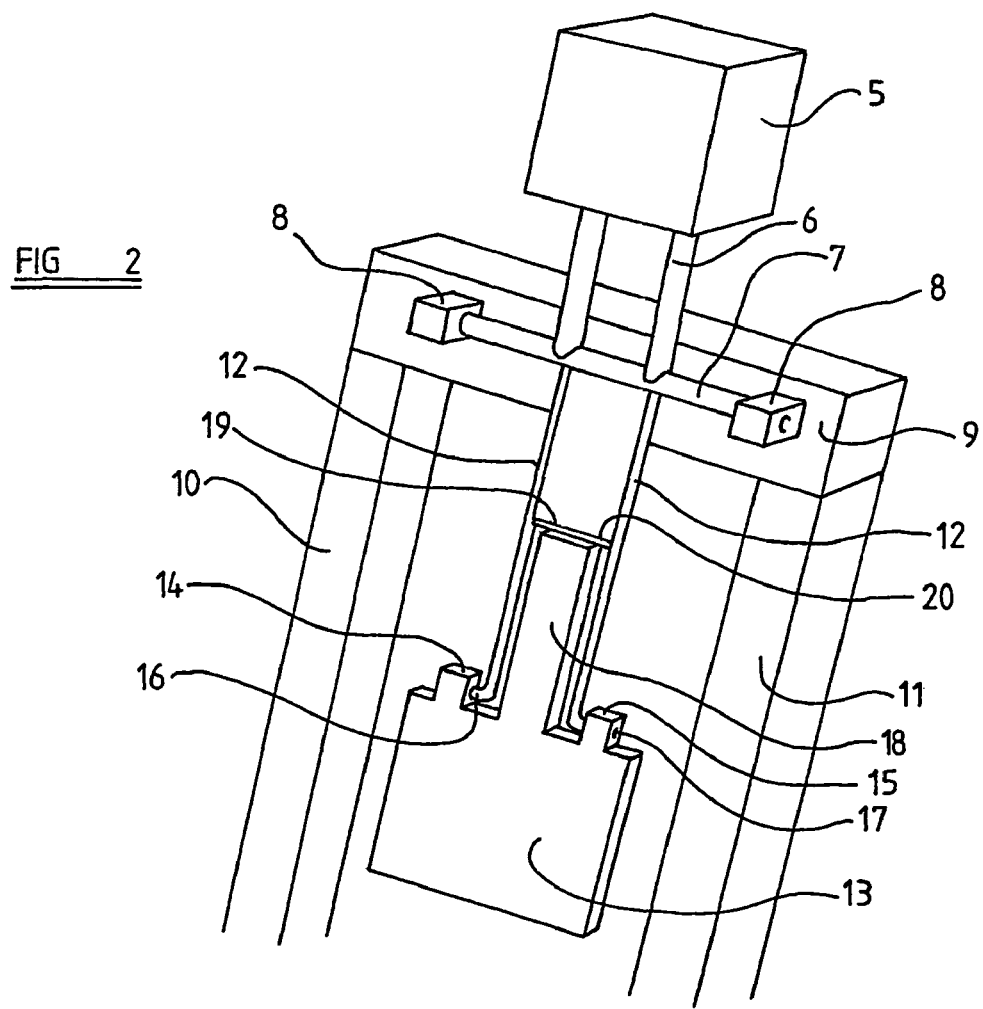
FIG. 2 is a front view of the seat of FIG. 1.
Figure 4:
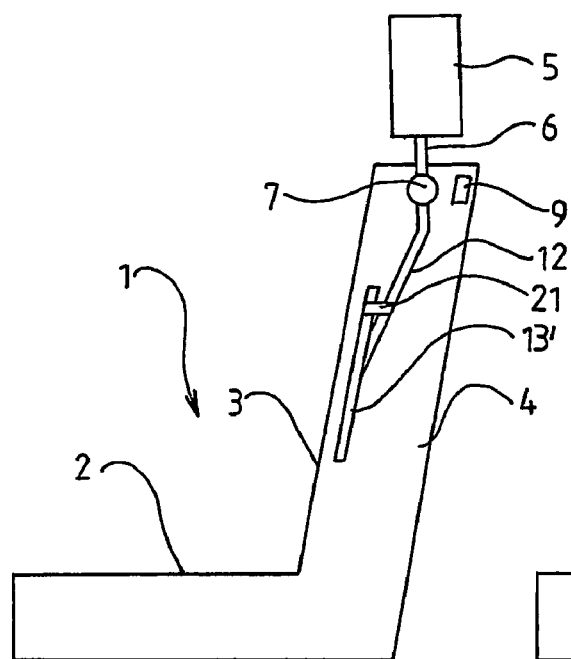
FIG. 4 is a schematic side elevational view of a vehicle seat incorporating a safety arrangement in accordance with an alternative embodiment of the invention.
Figure 5:
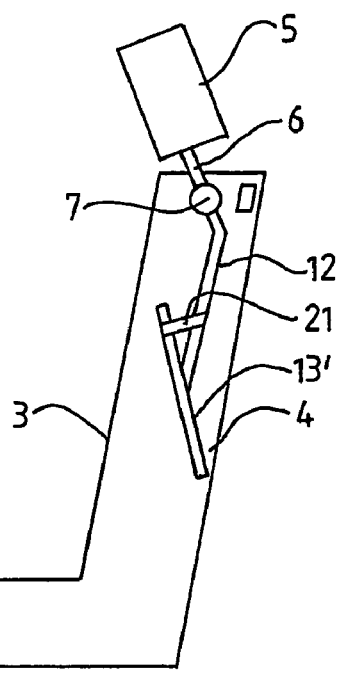
FIG. 5 and FIG. 6 are views corresponding to FIG. 4 showing the seat in alternate conditions.
Figure 6:
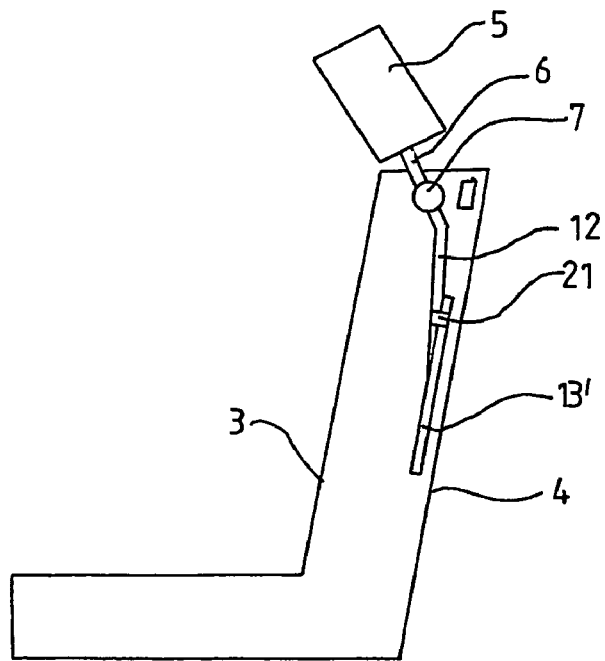

Referring to FIG. 4 and FIG. 5, a vehicle seat 1 intended for use in a rear seat with the safety arrangement in accordance with an alternative embodiment of the invention have a pressure plate 13' pivotally connected to lower ends of the depending arms 12 and carried at the lower ends of the depending arms 12. The pressure plate 13' extends upwardly and downwardly from the pivoting axis. The pressure plate is in ordinary use held in a position relative the depending arms 12 by deformable bands 21. As for the embodiment shown in FIGS. 1, 2 and 3 will, when a vehicle in which a seat with a safety arrangement according to the embodiment shown in FIG. 4 and FIG. 5 is mounted is subjected to a rear impact, the torso of an occupant be forced into the back-rest of the seat. The torso will then engage the pressure plate 13' and the combination of the pressure plate 13', the parallel arms 12, the horizontal bar 7, the arm 6 and the head rest 5 will pivot about the axis of the bar 7 such that the head rest 5 will begin to move forwardly. Also for this embodiment the lower-most end of the pressure plate 13' will strike the rigid panel 4 at the rear of the back-rest 3. Continuing pressure applied to the pressure plate 13' by the torso of the occupant of the seat will cause the bands 21 to deform so that the upper part of the pressure plate will start to rotate about the pivoting axis. As can be seen from FIG. 5 and FIG. 6, this means that the pressure plate 13' will pivot about the pivoting axis. The lower part of the pressure plate that is engaging with the rigid panel 4 will slide down whilst the upper part of the pressure plate 13' continues to move rearwardly, thus moving the depending arms 12 to rearward position in which they substantially abut the rear panel 4. This enables the head rest 5 to move forward sufficiently to engage the head of the occupant of the seat, to minimize or obviate the risk of a whiplash injury occurring.

It is to be appreciated that the described movement of the head-rest being effected against a bias provided by the springs or resilient means, if provided.

In a further embodiment of the invention the head-rest and the depending parallel arms are mounted on a horizontal rotatable bar which extends between the two vertical parallel arm members that form the frame in the back of the seat. The rotatable bar itself forms the transverse part of the inverted "U" shaped frame.

In the present Specification "comprise" means "includes or consists of" and "comprising" means "including or consisting of".

What is claimed is:

1. A safety arrangement for a motor vehicle seat, the safety arrangement comprising a head-rest, means to mount the head-rest for pivotal movement about a first predetermined horizontal axis adjacent the support part of a back-rest of the seat, and depending means adapted to extend downwardly within the back-rest of the seat beneath the first predetermined axis, and which carry a pressure plate to be located within the back-rest at a position behind a torso of an occupant of the seat, so that pressure applied to the pressure plate will cause the head-rest to move, characterized by the rear of the back-rest having a rigid panel and the pressure plate being pivotally connected to the depending means such that continuing pressure applied to the pressure plate after the pressure plate strikes the rigid panel causes the pressure plate to pivot relative to the depending means.

2. An arrangement according to claim 1 wherein the depending means comprise parallel arms.

3. An arrangement according to claim 1 wherein the pressure plate is provided with an integral locating element extending upwardly above a second axis about which the pressure plate is pivotally connected to the depending means, the locating element being releasably connected to the depending means.

4. An arrangement according to claim 3 wherein the locating element is connected to the depending means by means of at least one spring clip.

5. An arrangement according to claim 3 wherein the locating element is connected to the depending means by means of at least one frangible element.

6. An arrangement according to claim 1 wherein a locating element is arranged in association with the pressure plate and the depending means in a position above a second axis about which the pressure plate is pivotally connected to the depending means.

7. An arrangement according to claim 6 wherein the locating element is deformable.

8. An arrangement according to claim 1 wherein the means to mount the head-rest comprise a substantially horizontal bar adapted to be mounted, by means of bearings, on a frame within the back-rest of the seat, an axis of the horizontal bar being the said first predetermined axis, the head-rest being connected to the bar.

9. An arrangement according to claim 8 wherein the depending means are connected to and depend from the bar.

10. A safety arrangement for a motor vehicle, the safety arrangement comprising:
a head-rest;
a substantially horizontal bar rotatably mountable in an upper part of a back-rest of a seat, the head-rest mounted to the substantially horizontal bar such that the head-rest can be pivotally moved about the substantially horizontal bar;
at least one depending arm extending downwardly from the substantially horizontal bar, the at least one depending arm capable of being positioned within the back-rest of the seat; and
a pressure plate for placement behind a torso of an occupant of the seat, characterized by the at least one depending arm being pivotally connected to the pressure plate such that pressure applied to the pressure plate will cause the head-rest to move, and the rear of the back-rest having a rigid panel such that continuing pressure applied to the pressure plate after the pressure plate strikes the rigid panel causes the pressure plate to pivot relative to the at least one depending arm.

11. An arrangement according to claim 10, wherein the at least one depending arm comprises two parallel arms.

12. An arrangement according to claim 10, wherein the pressure plate has an integral locating element extending upwardly above an axis about which the pressure plate is pivotally connected to the at least one depending arm, the locating element being releasably connected to the at least one depending arm.

13. An arrangement according to claim 12, wherein the locating element is connected to the at least one depending arm by at least one spring clip.

14. An arrangement according to claim 12, wherein the locating element is connected to the at least one depending arm by at least one frangible element.

15. An arrangement according to claim 10, wherein a locating element is arranged in association with the pressure plate and the at least one depending arm in a position above an axis about which the pressure plate is pivotally connected to the at least one depending arm.

16. An arrangement according to claim 15, wherein the locating element is deformable.

17. An arrangement according to claim 10, wherein the substantially horizontal bar is mountable, through the use of bearings, on a frame within the back-rest of the seat.

* * * * *